United States Patent [19]

McCall et al.

[11] Patent Number: 5,077,094

[45] Date of Patent: Dec. 31, 1991

[54] PROCESS FOR APPLYING A METAL COATING TO A METAL STRIP BY PREHEATING THE STRIP IN A NON-OXIDIZING ATMOSPHERE, PASSING THE STRIP THROUGH A MELT POOL OF THE METAL COATING MATERIAL, AND RAPIDLY COOLING THE BACK SURFACE OF THE STRIP

[75] Inventors: James L. McCall; Robert E. Maringer, both of Columbus, Ohio

[73] Assignee: Battelle Development Corp., Columbus, Ohio

[21] Appl. No.: 449,697

[22] Filed: Dec. 11, 1989

[51] Int. Cl.$^5$ .............................................. B05D 3/02
[52] U.S. Cl. .................................. 427/319; 427/398.2; 427/431; 427/436; 164/461; 164/463
[58] Field of Search ...................... 427/398.2, 431, 433, 427/436, 321, 319; 164/463, 461

[56] References Cited

U.S. PATENT DOCUMENTS

| | | | |
|---|---|---|---|
| 3,201,275 | 8/1965 | Herrick | 117/213 |
| 3,479,210 | 11/1969 | Ross | 117/114 |
| 3,971,123 | 6/1976 | Olsson | 29/527.7 |
| 4,152,471 | 5/1979 | Schnedler et al. | 427/310 |
| 4,171,392 | 10/1979 | Sievert et al. | 427/321 |
| 4,177,326 | 12/1979 | Windal et al. | 428/645 |
| 4,321,289 | 3/1982 | Bartsch | 427/287 |
| 4,323,419 | 4/1982 | Wakefield | 156/622 |
| 4,326,579 | 4/1982 | Pond, Sr. et al. | 164/461 |
| 4,529,628 | 7/1985 | Haour et al. | 427/319 |

Primary Examiner—Shrive Beck
Assistant Examiner—Benjamin L. Utech
Attorney, Agent, or Firm—Barry S. Bissell

[57] ABSTRACT

A process for applying a metal coating 11 to a metal strip substrate 2 by preheating the casting surface in a non-oxidizing atmosphere and maintaining a casting surface temperature $T_s$ below the solidus temperature of the metal coating material, passing the casting surface through a melt pool 9 of the metal coating material at a pool temperature at least 25° C. in excess of its melting temperature to deposit a melt layer 21 at a casting temperature $T_c$, and simultaneously rapidly cooling the metal strip substrate from the back surface to solidify the melt layer to an adherent solid coating, wherein the surface temperature $T_s$ is less than about 20 percent (in °K.) below the casting temperature $T_c$.

The process is particularly useful when coating metal strip with an alloy of limited solubility metals.

10 Claims, 2 Drawing Sheets

PROCESS FOR APPLYING A METAL COATING TO A METAL STRIP BY PREHEATING THE STRIP IN A NON-OXIDIZING ATMOSPHERE, PASSING THE STRIP THROUGH A MELT POOL OF THE METAL COATING MATERIAL, AND RAPIDLY COOLING THE BACK SURFACE OF THE STRIP

FIELD OF THE INVENTION

There are many commercial processes for applying a metal coating to a metal strip substrate. But some applications require that the coating material be an alloy of metals with limited solubility. In particular, copper-lead, aluminum-lead and aluminum-tin alloys are desirable bearing materials. But the lead or tin has very limited solubility in copper and aluminum. To make a coating with a useful microstructure, these alloys have to be cooled very rapidly. Current practice for producing coatings of these alloys on a steel strip has a thick layer being poured on the steel substrate. After solidification, more than half of the upper surface is removed down to the desired thickness. The rough cast edges also generally need to be trimmed. Strip speeds of about 3 meters or less per minute are typical. Clearly, there is substantial waste of materials and labor. The current process also frequently results in non-homogeneous microstructures in the coatings, less than optimum microstructures and properties in the substrate material because of excessive heating and areas of poor interfacial bonds between the coating and the substrate (i.e. dis-bonds).

The current assignee is the owner of several patents covering a method of producing strip by a rapid solidification process directly from the melt (for example, U.S. Pat. No. 4,865,117). The process is known as melt drag. It uses some apparatus, including an open tundish, which is similar to the apparatus used in this process. But the melt drag process applies a melt layer to a substrate and then causes its release from the substrate as a solid strip. The present invention is a process to bond a melt coating to a substrate.

SUMMARY OF THE INVENTION

It is an object of the invention to provide a process for applying a metal coating to a metal strip.

It is further an object to provide a process for applying a coating of an alloy which is comprised of two metallic components (or elements) which are of limited solubility or liquid immiscible.

It is also an object to provide a process which is substantially faster than current coating processes resulting in higher productivity and, being a near-net-shape process, results in less scrap.

In accordance with these objectives, the invention is a rapid solidification process for producing a near-net-shape, coated product having a commercially-acceptable, as-cast thickness, shape and surface smoothness. The process for applying a metal coating to a metal strip substrate comprises the steps of providing a melt pool of the metal coating material at a pool temperature at least 25° C. in excess of its melting temperature (i.e. 25° C. superheat), preheating the casting surface of the substrate in a protective atmosphere and maintaining a casting surface temperature $T_s$ below the solidus temperature of the melt, passing the casting surface of the substrate at temperature $T_s$ through the melt pool to deposit a liquid layer of the coating material at a casting temperature $T_c$, and rapidly cooling the substrate from the back surface to solidify the liquid layer to an adherent solid coating, wherein the surface temperature $T_s$ is less than about 20% (in °K.) below the casting temperature $T_c$.

Typically, the process also includes chemically cleaning and abrading the substrate to remove oil and grease from an upper casting surface of the metal strip substrate and to remove oxides or other impurities prior to preheating. The process further includes cooling the metal strip substrate and adherent solid coating from both sides after solidification of the liquid layer.

It is preferred that the casting surface is preheated to a casting surface temperature $T_s$ of at least about 400° C. in excess of the temperature of the back surface away from the casting surface. This allows the quicker removal of heat from the substrate, more rapid solidification of the coating and less thermal alteration to the substrate material. For casting Cu-Pb alloy on a steel substrate, it is preferred that the surface temperature $T_s$ be at least about 800° C. It is also preferred that an oxidizable casting surface such as steel is preheated in a reducing atmosphere.

DESCRIPTION OF THE PREFERRED EMBODIMENTS

A current commercial process for producing a bearing layer on a metal strip substrate comprises the casting of a thick layer of bearing alloy (for example, about 1 mm) on the substrate and the subsequent removal of the upper two-thirds of the layer by milling (to produce a coating of about 0.35 mm). The edges are also trimmed to specification. The process operates at less than about 3 meters per minute. The present invention is a near-net-shape process which therefore allows the production of a coated substrate which does not require the time and cost of substantial milling and trimming after coating. Moreover, the process is a rapid solidification process which speeds the production rate to upwards of 30 meters per second. The rapid solidification also yields an isotropic coating and prevents excessive interfacial diffusion between coating and substrate and the formation of undesirable (brittle) phases at the interface. A key to the improvement of the process resides in the use of an open tundish as is used in the prior melt drag strip forming process, and the preheating of the substrate to provide good adhesion of the coating.

Figure 1:
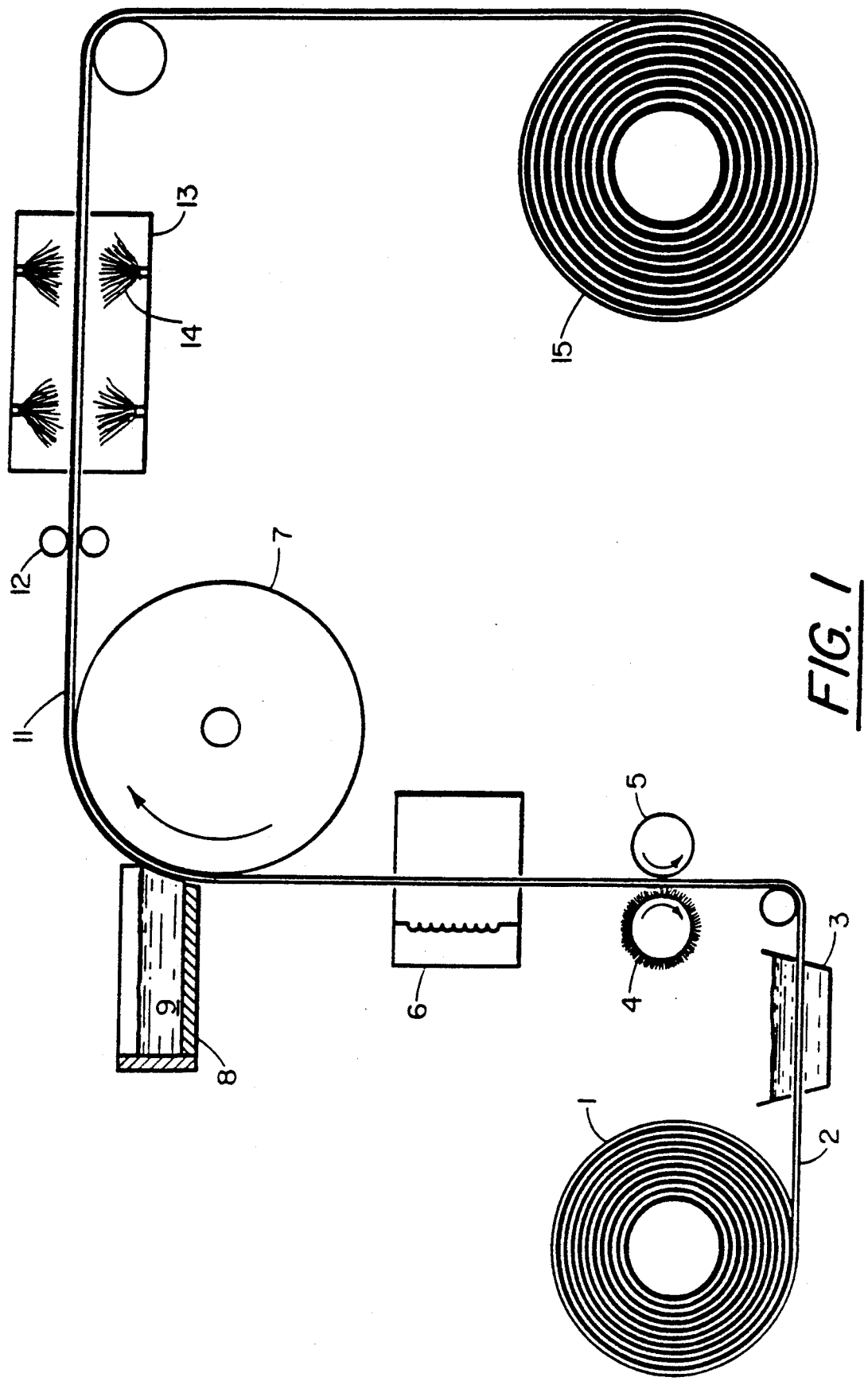
FIG. 1 is a schematic representation of the inventive process and the apparatus for practicing the process.

The process is schematically shown in FIG. 1. A coil 1 of the substrate strip 2 is shown. The strip can be any metal which can withstand the temperature of the molten coating material. Its thickness is limited by the necessity to bend it over the rollers further in the process. Substrate thicknesses of 0.3-6 mm, and more preferably 1-3 mm, are useful. Grease and oil on the strip 2 are removed in chemical bath 3. A stiff brush or abrasive wheel 4 and a backing roll 5 are used to abrade the casting surface of the substrate strip to physically remove any oxides or other impurities from the surface which would prevent the adherence of the coating.

Before significant oxidation can take place after the cleaning step, the substrate strip is passed through a preheater 6 on its way to the coating station. The preheater should be positioned as close to the tundish as possible so that the temperature of the casting surface will be maintained at the desired temperature.

During preheating, a protective atmosphere (non-oxidizing or reducing for an oxidizable surface) surrounds the substrate to prevent further oxidation. It is preferred that the atmosphere be controlled to not only prevent additional oxidation, but also to reduce any surface oxidation left on the surface by the brush. When coating a steel substrate with a copper alloy, we found that an oxygen level below 100 ppm and an atmosphere of forming gas (nitrogen-10% hydrogen) was especially desirable to further reduce the surface oxidation and to produce a good surface for casting.

The preheater is a critical element of the process. Control of the preheating process is necessary to speed the process. On the one hand, the preheater is necessary to raise the temperature of the casting surface high enough to obtain good adherence of the coating. The ability of the heater to rapidly heat the strip is therefore important. On the other hand, most of the heat added to the strip has to be removed in the solidification process. Too much heat will slow the process as the time needed for heat removal is increased. High temperatures may also modify the substrate and thereby deteriorate its properties. So, ideally, a heating method should be selected which rapidly heats only the casting surface and not the interior or back surface of the substrate. Though other heating methods may be used, we have found that the application of induction heating (particularly, high frequency induction heating using a flat, transverse-flux coil) is extremely useful in satisfying the requirements of the preheater. The coil and flux may be adjusted to concentrate the heating on the surface.

We have found that the casting surface of the substrate strip should be at a temperature which is within about 20% of the temperature (°C.) of the liquid coating material when applied to the substrate. At lower temperatures, the coating does not adhere well to the strip. We also prefer that the casting surface is preheated to a temperature of at least about 400° C. in excess of the temperature of the back surface away from the casting surface. This allows the quicker removal of heat from the substrate, the more rapid solidification of the coating and overall improvement in process speed, productivity and process economics.

The preheated substrate passes out of the preheater in the proximity of the chill wheel 7 and the tundish 8. It contacts the chill wheel and then immediately passes through the melt pool 9 in the tundish. It is critical that the strip not contact the chill wheel too soon before passing through the melt, or the substrate temperature will be reduced below that necessary for good adhesion. The chill wheel may be internally-cooled. Various wheel materials can be used, but we have found copper or steel to be particularly useful. The wheel surface is typically polished to provide sufficient contact with the melt for good heat transfer.

Figure 3:
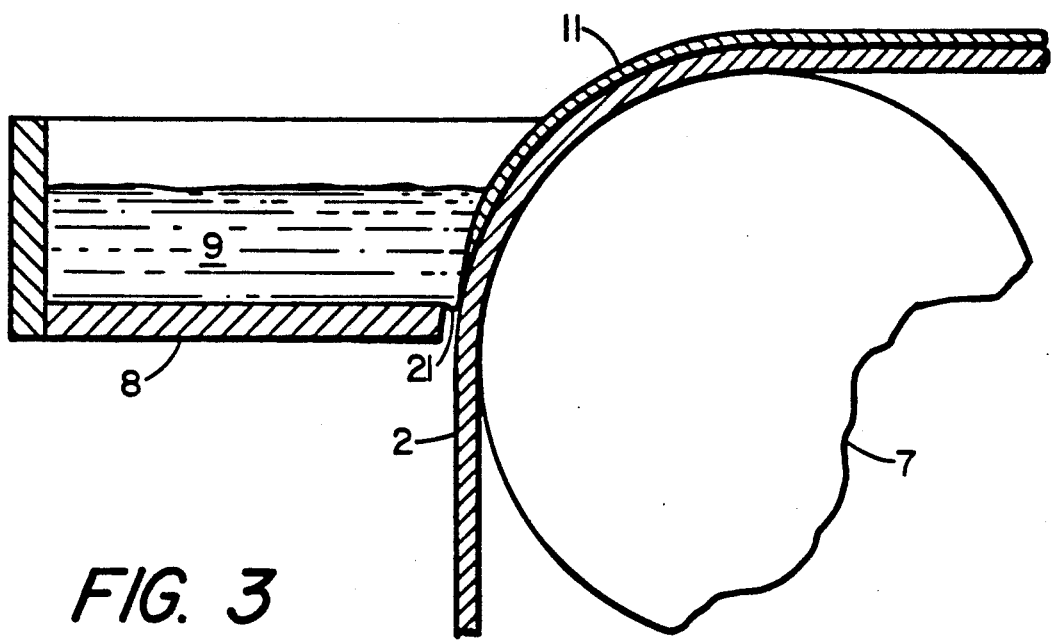
FIG. 3 shows an enlarged elevation view of the open tundish for delivering liquid coating material to the substrate.

As more clearly shown in FIG. 3, the tundish 8 is an open, refractory reservoir with one end wall missing and replaced by the adjacent substrate casting surface of the substrate 2 moving on the chill wheel 7. The sidewalls of the tundish are contoured to match the contour of the chill wheel and prevent leakage of melt. The melt 9 contacts the substrate along an area of contact to form a liquid layer 21 which solidifies to a solid coating 11. The level of the melt 9 in the tundish is controlled to provide the length of contact with the substrate strip to produce the desired coating thickness. Wheel speed is also an important factor in coating thickness. The width of the tundish defines the sides of the coating.

The melt is superheated to a temperature at least 25° C. in excess of its melting temperature so the temperature at the casting surface is still above the melting temperature. A controlled atmosphere over the tundish is also preferred to avoid oxidation of the surface. The tundish preferably provides melt at a location on the chill wheel between about 30°-90° from the vertical.

Figure 2:
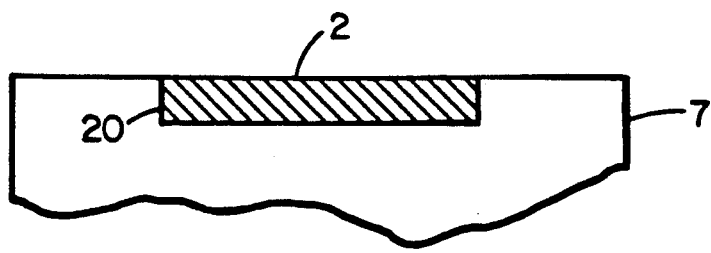
FIG. 2 is an elevation view showing one embodiment of the substrate and casting wheel.

The substrate strip can roll directly on the flat chill wheel surface, or a groove can be made in the chill wheel surface to guide and position the strip and to expose only the upper casting surface to the melt. This latter embodiment is shown in FIG. 2 where a groove 20 is cut in the surface of the chill wheel 7 to guide and position the substrate 2. This also creates a flat surface across the width of the chill wheel against which the tundish can be closely mated.

Looking again at FIG. 1, the substrate strip is held tightly against the chill wheel by rolls 12 to maintain good heat transfer. The size and speed of the chill wheel are controlled to produce the desired coating thickness. It is preferred that the substrate strip be in contact with the chill wheel until the coating is completely solidified to coating 11. When intimate contact of the strip substrate and the chill wheel is not attainable, an intermediate layer of conformable and resilient heat transfer material may be used between the substrate and the chill wheel.

An optional heater (not shown) may be utilized to apply heat to the surface of the melt as it emerges from the melt pool on the substrate, but before full solidification. This retards solidification from the upper surface. It has been found that allowing the solidification to proceed from the chill wheel results in a more preferred microstructure.

The solidified coating and substrate are further cooled in the cooling chamber 13 where a liquid spray 14 impacts both surfaces. A product coiler 15 maintains a tension on the substrate strip and coating.

In our process, the preheater has been the limiting factor in the speed of the process. Still, speeds of 5-25 m/sec seem attainable. This is substantially faster than current process for making bearing alloy, for example. The substrate strip is typically a material which can withstand the high temperatures of the process. Steel has been used rather extensively and is the preferred substrate for some uses. The coating can be any number of metals and alloys. But, certain limited solubility systems such as Cu-Pb, Al-Pb and Al-Sn can benefit the most from this rapid solidification process. Coating thicknesses in the range of 0.3 to 3 mm, and more preferably 0.5-1.5 mm, are produced.

Figure 4:
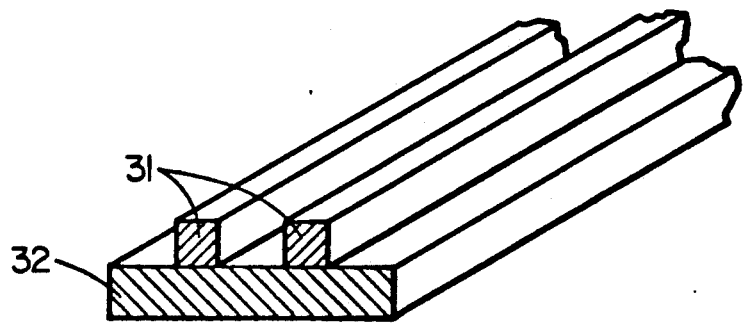
FIG. 4 shows a product having multiple strips of wear-resistant material cast according to the process.

FIG. 4 shows a product which can be made according to an embodiment of the invention. The product depicted may be a friction surface or a wear resistant surface, for example. Two strips of coating material (though additional strips could of course be laid) have been cast simultaneously according to the process, either from one tundish having a dividing wall, or from two adjacent tundishes. The process allows the production of a product with discrete strips of an adherent coating, so that the entire surface does not need to be coated.

EXAMPLES OF THE PREFERRED EMBODIMENTS

A bearing alloy of composition Cu/21Pb/1.5Sn having a melting temperature of about 1020° C. was pooled to a depth of about 2 cm at about 1175° C. in a Kaowool tundish such as shown in FIG. 3. A 1008 steel strip, 5.7 cm wide by 1.2 mm thick was prewashed to remove grease and abraded with a SiC flapper brush to remove loose particles and oxides.

The substrate strip was heated in a reducing atmosphere to about 925° C. using a transverse flux induction heater at 230 kw and 10,000 hertz. The atmosphere was forming gas (90% nitrogen, 10% hydrogen) and the oxygen concentration was less than 40 ppm (0.004%). Surface oxides were reduced to elemental iron.

The hot substrate strip was contacted with a copper chill wheel rotating at a surface speed of about 12 m/min and immediately passed through the melt to deposit a liquid layer of about 1.3 mm. The liquid layer solidified on the chill wheel to a solid strip which was removed from the chill wheel and sprayed with water to further quench the coated strip.

The coating was very adherent and showed no cracks or discontinuities, except for some small porosity very close to the top surface of the coating.

We claim:

1. A process for applying a metal coating to a metal strip substrate comprising the steps of
    (A) providing a melt pool of the metal coating material at a pool temperature at least 25° C. in excess of its melting temperature,
    (B) preheating the casting surface in a non-oxidizing atmosphere and maintaining a casting surface temperature $T_s$ below the solidus temperature of the metal coating material,
    (C) passing the casting surface of the metal strip substrate at temperature $T_s$ through the melt pool to deposit a liquid layer of the metal coating material at a casting temperature $T_c$, and
    (D) simultaneous with depositing the liquid layer, rapidly cooling the metal strip substrate from the back surface away from the casting surface to solidify the liquid layer to an adherent solid coating, wherein the surface temperature $T_s$ is less than about 20% (in °K.) below the casting temperature $T_c$.

2. The coating process as recited in claim 1 which further includes
    preheating the casting surface of the metal strip substrate in a non-oxidizing atmosphere to a casting surface temperature $T_s$ of at least about 400° C. in excess of the temperature of the back surface away from the casting surface.

3. The coating process as recited in claim 2 which further includes
    preheating the casting surface by means of induction.

4. The coating process as recited in claim 1 which further includes
    preheating the casting surface in an reducing atmosphere.

5. The coating process as recited in claim 4 which further includes
    providing a steel substrate, and preheating the casting surface thereof to a temperature of at least 800° C.

6. The coating process as recited in claim 1 which further includes
    passing the casting surface through the melt pool and rapidly cooling the metal strip substrate by contacting the surface of the substrate strip away from the casting surface with the outer cylindrical surface of a rotating chill wheel.

7. The coating process as recited in claim 6 which further includes
    positioning the strip substrate in a groove in the chill wheel such that the casting surface is flush with the outer cylindrical surface of the chill wheel.

8. The coating process as recited in claim 1 which further includes abrading an upper casting surface of the metal strip substrate to remove oxides prior to preheating.

9. The coating process as recited in claim 1 for applying an alloy coating which further includes
    providing a melt pool of a metal coating material comprising at least two metals of limited solubility.

10. The coating process as recited in claim 1 for applying an alloy coating which further includes simultaneously passing the casting surface of the metal strip substrate through at least two melt pools to deposit discrete liquid layers of the metal coating material, and rapidly cooling the metal strip substrate to solidify the discrete liquid layers to separate solid coating strips.

* * * * *